Dec. 22, 1931. H. ALFARO 1,837,186
AEROPLANE
Filed Nov. 28, 1927 2 Sheets-Sheet 1

Inventor
Heraclio Alfaro
By Evans & McCoy
Attorneys

Dec. 22, 1931.  H. ALFARO  1,837,186
AEROPLANE
Filed Nov. 28, 1927    2 Sheets-Sheet 2
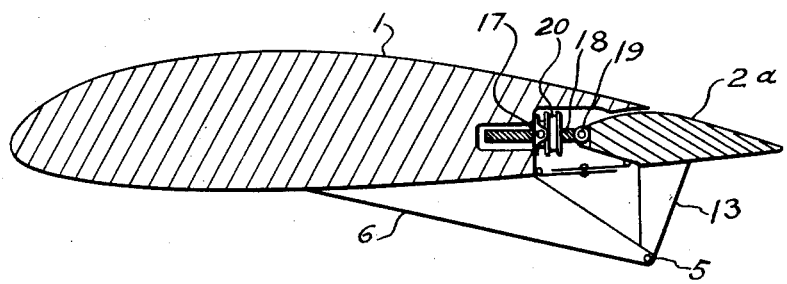
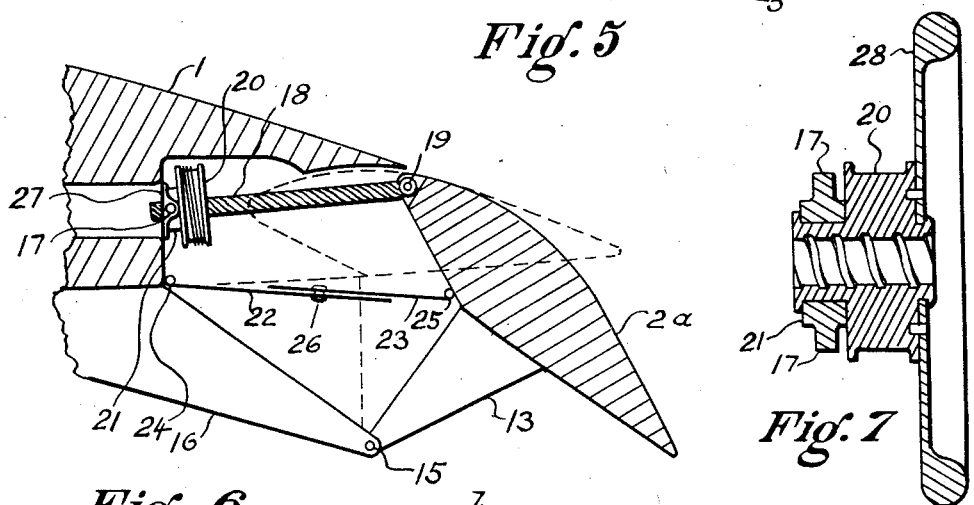
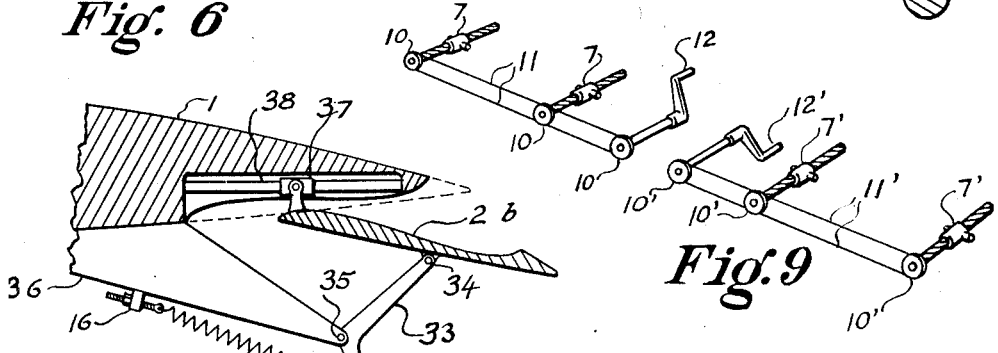
Inventor
Horacio Alfaro
Evans & McCoy
By            Attorneys Patented Dec. 22, 1931

1,837,186

UNITED STATES PATENT OFFICE

HERACLIO ALFARO, OF EAST CLEVELAND, OHIO

AEROPLANE

Application filed November 28, 1927. Serial No. 236,342.

This invention relates to aeroplanes, and more particularly to the lifting surfaces or wings of aeroplanes in which a great lifting capacity is desired.

Slow landing speed in aeroplanes can be obtained by using larger or more effective lifting planes than necessary for fast flying. Thus, an aeroplane of the usual type, designed for a low landing speed must have larger wings than are needed for straight normal flight. These oversize wings are the cause of excessive head resistance in normal flight, which checks the speed of the aeroplane and reduces economy in traveling. Furthermore, oversize wings are heavier and reduce the carrying capacity of the aeroplane.

An object of this invention is to provide aeroplane wings of a character such as to furnish enough lift to allow slow landing with moderate size wings.

Another object of my invention is to provide aeroplanes with a large speed range, that is, a great ratio of maximum speed over minimum speed thus allowing a higher normal flying speed to an aeroplane having a given safe landing speed.

A further object of the invention is to provide aeroplane wings of lighter total weight than would be otherwise practicable for a given maximum lifting capacity at a given speed.

Still another object of this invention is to provide a simple means to obtain the mentioned increase in the lifting capacity and with a minimum amount of accessory apparatus which may be easily manipulated when desired.

Still a further object of this invention is to obtain a greater lifting power from aeroplane wings without hampering the responsiveness of the controlling elements or the balance.

One more object of this invention is to provide a larger drag of the aeroplane through the air when desired, so as to allow a shorter run when landing and a steeper glide in negotiating a landing over high obstacles without increasing the flying speed to an undesirable extent.

In the drawings, Fig. 1 is an airfoil provided with the device of the present invention.

Figs. 5 and 6 are sectional views showing a modified form of the invention, Fig. 5 showing the lift increasing flap in normal position, and Fig. 6 showing the flap set for obtaining the maximum lifting capacity.

Fig. 7 is a sectional view showing a handwheel by means of which the flap adjusting mechanism may be operated.

Fig. 8 is a sectional view showing a further modification of the invention.

Fig. 9 is a detail of the adjusting mechanism.

Figure 1:
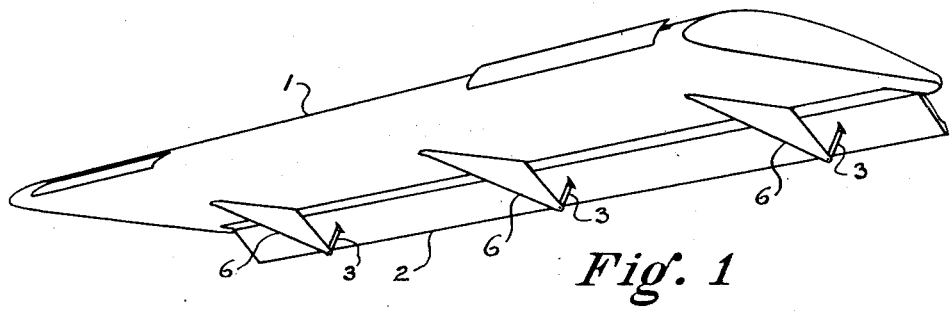

My invention contemplates advantageous means of increasing the lifting capacity of airfoils and furthermore of adjusting said lifting capacity within practical limits. I have found that by placing near the trailing edge of the lifting surface, a flap that can travel backwards at the same time it is being folded down, the lift of a wing can be considerably increased. This combined motion of the flap provides an increase in the camber simultaneously with an increase in the chord of the airfoil; the increase in camber and the increase in chord each having the effect of increasing and lifting capacity of the airfoil. I have, furthermore, found that a flap of this type can be connected mechanically in a manner such that it may be adjusted with a relatively small effort.

Also, I have found that, by replacing the usual ailerons by another device giving the proper rolling control, and when said device is placed near the trailing edge, a larger flap can be used along the whole span of the airfoil. Preferably, I use a rolling control system as the one covered in my copending application Serial No. 236,341, filed Nov. 28, 1927, although other types that do not conflict with the use of a full span flap may be employed. In the drawings, the "spoiler" type of control is shown, but it is to be understood that this invention can also be used in combination with ordinary ailerons using a smaller flap in span or also in combination with a differential mechanism for operating twin portions of the flap that replace the usual ailerons.

Moreover, I have found that the maximum lifting power of an airfoil equipped with my invention will be obtained within practical angles of flight.

Figure 2:
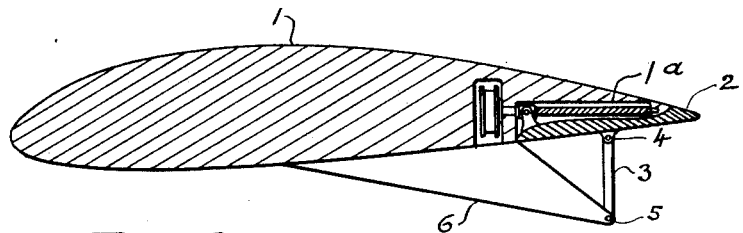
Fig. 2 shows the lift increasing gear and its control in normal flying position.

There is illustrated in Figs. 1, 2, 3 and 4 of the drawings an airfoil 1 of any type with a recess 1—a near its trailing edge in which is located a flap or auxiliary surface 2. It is preferred that, in normal position, the outer face of the flap should follow closely the outer lines of the airfoil selected as shown in Fig. 2.

As herein illustrated, the flap extends nearly the full length of the airfoil, its ends lying within the rounded corners at the tips of the airfoil for convenience of construction. At suitably spaced points along the length of the flap 2, links 3 are connected at one end by means of pivot pins 4 to the flap and at their opposite ends by pivot pins 5 to projecting structural members 6 which form rigid parts of the airfoil structure. For simplicity of illustration, only three of the above described connections are shown in Fig. 1, but it is to be understood that any number desired can be used.

Figure 3:
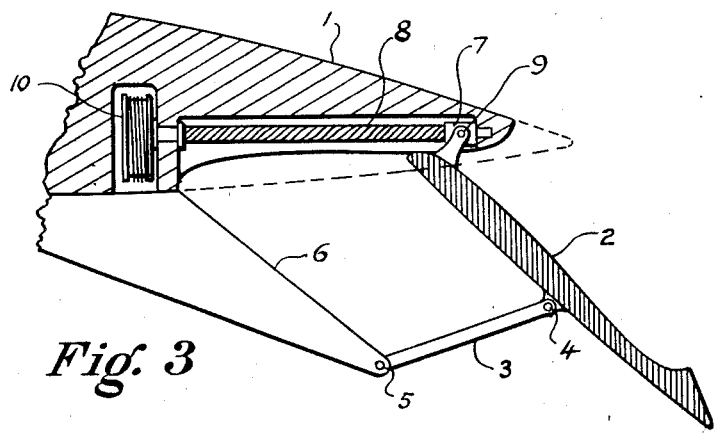
Fig. 3 shows the same gear and control set for obtaining maximum lifting capacity.
Figure 4:
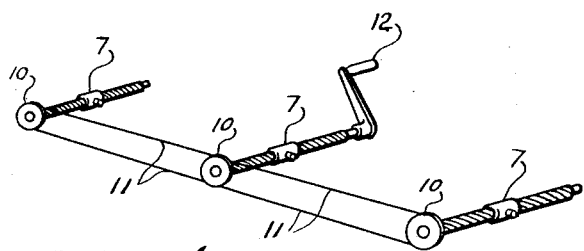
Fig. 4 shows the operating mechanism of the device.

Furthermore, the flap 2 is pin jointed at 9 to bushings 7 which are interiorly threaded and mounted on screws 8 mounted on the airfoil in the recess 1—a and disposed transversely with respect to the flap so that a fore and aft motion of each bushing 7 is obtained when its screw 8 is rotated. A drum 10 is keyed to each screw 8 and all drums 10 are connected for simultaneous rotation at equal speeds and in the same direction by any suitable means such as driving cables 11. Power may be applied to the screws to operate the same by any suitable manual or power operated means which for simplicity is shown herein as a handle 12 operatively connected to one of the screws 8 and so positioned as to be within convenient reach of the operator to enable the operator to turn the screws 8 to simultaneously shift the bushings 7 and alter the position of the flap 2 anywhere from its normal position as shown in Fig. 2 to its lowest setting as shown in Fig. 3.

The upper face of the flap and inner surface of the recess 1—a of the airfoil 1 may be of any shape desired but in some cases it may be advantageous to allow air to pass between the recess of the airfoil and the flap, in which case the recess and the upper face of the flap may be so formed as to obtain the most advantageous form of air passage for each position of the flap.

The flap 2 is preferably adjustable through a relatively large angle about its pivot 9. Although the increase of lift is relatively slight after the flap has been adjusted to an angle of more than 30° with respect to the under surface of the wing, the increase in drag is relatively great as the angle of the flap is increased beyond 30°. With flaps extending the full length or throughout the greater part of the length of the wings and with independent means of lateral control, the adjustment of the flaps through angles greater than necessary for obtaining the desired increase in lift is highly advantageous for increasing the drag and reducing the velocity when gliding at steep angles.

A modified mounting of the flap on the airfoil which in some instances may be preferable to that above described is shown in Figs. 5, 6 and 7, although as great an increase in the chord of the airfoil as the example just described is not obtained. In this modification, a flap 2—a corresponding to the flap 2 above described is rigidly connected to one or more arms 13 which are pivoted at 15 to projecting structural members 16 forming a rigid part of the airfoil structure.

The inner edge of the flap 2—a is connected to the outer ends of one or more screws 18 by pivot pins 19 and each screw 18 is threaded through an interiorly threaded drum 20 which is rotatably mounted on a collar 21, mounted on the airfoil within the forward portion of the flap receiving recess, each collar 21 carrying laterally projecting trunnions 17 journaled in a bearing 17 rigidly connected to the structure of the airfoil.

If a plurality of drums 20 and screws 18 are employed, the drums will be connected for simultaneous rotation in a manner similar to the drums 10 above described.

Rotation of the drum or drums 10 will result in a translation of the screw or screws 18 which will cause angular movement of the flap bodily about the pivotal axis of the supporting arms 13 to control the position of the flap relative to the airfoil. As in the modification first described, suitable means is employed to operate the screws and this means may comprise a handwheel 28 which is fixed to one of the drums 20. Where it is desired to close the gap between the airfoil and flap, a suitable sliding or telescopic shield is provided which, as shown in Fig. 6, may consist of a pair of metal plates 22 and 23 hinged to the airfoil at the forward end of the recess and to the flap respectively, at 24 and 25 and held in face to face engagement by rivet and slot connections indicated at 26. During movement of the flap, these plates will slide one upon the other providing an air seal between the airfoil and flap and presenting a smooth surface between their hinges 14 and 15.

In some cases it will be found advantageous to employ an automatic control for the flap. One way of providing automatic control is to provide linkage controlling the position of the flap which is elastic and permits the flap to assume varying angular positions as it is subjected to varying air pressure at different speeds. The elastic support for the flap may be provided by replacing the screw and bushing in the modifications above described with connecting members between the inner edge of the flap and the airfoil which will permit free movement of the flap from its uppermost to its lowermost position and by providing a spring connection between the airfoil and flap by which the flap is normally held in its lowermost position but which permits the flap to move toward its uppermost position when acted upon by an air pressure in excess of a predetermined amount.

The spring connection may be so arranged as to vary the effective force thereof in different angular positions of the flap in accordance with variations in the effective air thrust opposing the spring in different positions of the flap. One means of obtaining the automatic control above referred to is illustrated in Fig. 8 of the drawings in which the inner edge of the flap 2—a is pivotally connected to collars 37 which slide freely on rods 38 fixed to the airfoil, the flap 2—b corresponding in structure to the flap 2 first described and the collars 37 and rods 38 replacing the bushings 7 and screws 8 in the modification first described. The flap 2—b is connected to projecting supports 36 by levers 33, which are connected to the flap 2—b and supports 36 by pivots 34 and 35. The levers 33 correspond to the links 3 in the modification first described except that each lever projects below its pivot 35 to provide a lever arm through which an actuating force may be transmitted to the flap. Connected to a pin 44 at the lower end of the lever 33, there is a coil spring 45 which is connected at its opposite end to a pin 16 carried by the support 36, the pin 16 being preferably adjustable to vary the tension of the spring. The pin 44 is so located in relation to the pivot pin 35 of the lever that the force of the tension spring 15 transmitted to the flap becomes less effective as the flap is rigged up and, therefore, is closer to the air loads on the flap.

The flap may be made up of independent sections independently mounted and of widths varying to obtain a taper in plan along the length of the airfoil, in which case the supporting and operating members for the individual sections will be so proportioned as to impart simultaneous and equal angular movements to the sectitons, while the translatitonal movements imparted must be proportional to the width of the flap at that particular point.

With my improved type of airfoil adapted in the above mentioned relation to an aeroplane, landing at low speeds is made easier without hampering other qualities of the machine. Thus, for a given lifting capacity at a given high speed with the flap rigged up, a larger lifting capacity can be obtained at low speeds by pulling down the flap; therefore lower landing speeds can be obtained. Due to the greater drag through the air produced by the flap when pushed down, an easier stop will be obtained after landing and steeper glides can be managed at a relatively low speed. In a given airplane having a satisfactory landing speed, the size of the wings can be reduced by using my invention with the result of a reduction in the structural weight and an increase of the maximum available speed. The arrangement of the leverages described makes it possible to operate the flap with relatively small effort. The use of this type of flap in combination with special types of rolling control such as ailerons of the lift spoiler type which control the air currents over the wing surfaces to vary the lift placed at the leading edge or near the airfoil tips as indicated at 45 in Fig. 1 will allow using a full span flap with its greater advantages.

It will thus be seen that I have provided advantageous improvements in lifting surfaces whereby aeroplanes can land at slower speeds than heretofore with proper rolling control.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. Aircraft having port and starboard wings, a flap extending along the rear edge of each wing having rotational movements about an axis extending longitudinally of the wing adjacent to and beneath the rear edge of the wing to effect an increase or decrease in the mean camber, said pivotal axis having a movement forwardly and rearwardly to effect an increase or decrease in the chord of the wing section, means to control the setting of said flaps relative to the wings, and means of changing the setting of the flap of one wing with respect to that of the other independently of the original setting of said flap with respect to the wing.

2. Aircraft having port and starboard wings, a flap extending along the rear edge of each wing, each flap extending substantially the full length of its wing and having rotational and translational correlative movements arranged to permit an increase or decrease in the mean camber simultaneously with an increase or decrease in the chord of the wing section, means to control the setting of said flaps relative to the wings one independently of the other, and means of lateral control independent of said flap mounted adjacent the forward edges of the wings.

3. Aircraft having port and starboard wings, a flap extending along the rear edge of each wing, each flap extending substantially the full length of its wing and having rotational and translational correlative movements arranged to permit an increase or decrease in the mean camber simultaneously with an increase or decrease in the chord of the wing section, independent means to control the setting of said flaps relative to each wing, and means of lateral control independent of said flap.

4. Aircraft having port and starboard wings, a flap extending along the rear edge of each wing, each flap extending substantially the full length of its wing and having rotational and translational correlative movements arranged to permit an increase or decrease in the mean camber simultaneously with an increase or decrease in the chord of the wing section, independent means to control the setting of each flap, and means to adjust unevenly the air loads on the wings for lateral control.

5. Aircraft having port and starboard wings, a flap extending along the rear edge of each wing and mounted for pivotal movement about an axis adjacent the forward edge of the flap, and for translational movement along the under side of the wing toward and away from the rear edge thereof, independent means for moving the flap of each wing bodily and swinging the same about its pivotal axis for simultaneously varying the mean camber and the chord of the wing, and means adjacent the forward edges of the wings for controlling the lift of said wings.

6. An airfoil having a flap extending along the rear edge thereof and mounted for movement bodily toward and from the rear edge of the airfoil and for pivotal movement about an axis adjacent the forward edge of the flap, means for causing said flap to swing downwardly about its pivotal axis upon rearward movement thereof, and means for actuating said flap to simultaneously vary the mean camber and the chord of the airfoil, said flap, when in its normal position, lying beneath the airfoil and having a bottom surface forming a continuation of the under surface of the airfoil, said flap having a rear tip portion, the top surface of which forms a continuation of the top surface of the airfoil in the normal position of the flap.

7. An airfoil having a flap along the rear edge thereof which is mounted for correlative rotational and translational movements for varying the mean camber and simultaneously the chord of an airfoil, means for controlling said correlative movements, said flap being contained when in normal position within the lines of the airfoil and opening up a gap between it and the body of the airfoil in positions other than normal, and an extensible shutter connecting the body of the airfoil and said flap.

8. Aircraft having port and starboard wings, a flap on each wing extending along the rear edge thereof beneath the wing and mounted for pivotal movement about an axis adjacent the forward edge of the flap, and for bodily movement toward and away from the rearward edge of the wing to obtain an increase or decrease in the mean camber of the wing simultaneously with an increase or decrease in the chord of the wing section, means to control the setting of the flaps relative to the wings, and means of lateral control independent of said flaps.

9. An airfoil having a member mounted upon the under side thereof for movement toward and away from the rear edge of the airfoil, a flap pivoted adjacent its forward edge to said member, and means for swinging said flap downwardly about its pivot upon rearward movement of said member, said flap in its normal position lying beneath the rear portion of the airfoil and having a bottom surface conforming to the curve of the bottom surface of the airfoil, said flap having a rear edge portion adapted to form the tip of the airfoil, the upper surface of said rear edge portion conforming to the top surface of the airfoil.

10. An airfoil having a member mounted upon the under side thereof for movement toward and away from the rear edge of the airfoil, a flap pivotally supported adjacent its forward edge by said member, means for swinging said flap downwardly about its pivot upon rearward movement of said member, and an extensible shutter connected to the body of the airfoil and to the under side of said flap.

11. An airfoil having a member slidably mounted upon the under side thereof for movement toward and away from the rear edge of the airfoil, a flap pivoted adjacent its forward edge to said member, means for shifting said member, a bracket attached to the airfoil and projecting rearwardly beneath the flap, and an arm pivoted at its lower end to said bracket and fixed at its upper end to said flap, for swinging said flap downwardly upon rearward movement of said member.

12. An airfoil having members mounted on the underside thereof for movement beneath the air foil toward and away from the rear edge thereof, a flap pivotally supported by said members to swing about an axis adjacent the forward edge of the flap, screws for shifting said members, means for simultaneously actuating said screws, and means connecting said flap with the body of the airfoil for swinging the flap about its pivotal axis upon movement of said members.

13. An airfoil having a recess along the rear edge thereof, a plurality of rotatable members mounted in said recess, each of said members having an axial threaded opening, a screw extending through each member and in threaded engagement therewith, a flap pivotally supported at its forward edge upon the rear ends of said screws, means for simultaneously rotating said rotatable members, and means connecting said flap with the body of the airfoil to swing the same about its pivots upon actuation of said screws.

14. An airfoil having members mounted on the underside thereof for movement beneath the air foil toward and away from the rear edge thereof, a flap pivotally supported on said members to swing about an axis adjacent the forward edge of the flap, means for simultaneously moving said members, and means connecting the flap and airfoil for swinging said flap downwardly about its pivotal axis upon rearward movement thereof, said flap having a curved top surface forming a continuation of the top surface of the airfoil in all positions of the flap.

15. Aircraft having port and starboard wings, a flap extending along the rear edge of each wing throughout the greater part of the length thereof, each flap being pivotally supported adjacent its forward edge for movement about a longitudinal axis located beneath the wing adjacent its rear edge and adjustable downwardly about said axis from a position substantially in the plane of the wing through angles in excess of 30° to obtain a relatively great increase in drag, and independent means of lateral control.

16. Aircraft having port and starboard wings, a flap extending along the rear edge of each wing throughout the greater part of the length thereof, each flap being pivotally supported adjacent its forward edge for movement about an axis extending longitudinally of the wing, beneath the wing and adjacent the rear edge thereof and for bodily movement beneath the wing toward and away from the rear edge of the wing, each flap being adjustable downwardly about said axis from a position substantially in the plane of the wing through angles in excess of 30° to obtain a relatively great increase in drag, and independent means of lateral control.

In testimony whereof I affix my signature.

HERACLIO ALFARO.